United States Patent [19]

Simmonds et al.

[11] Patent Number: 4,844,667

[45] Date of Patent: Jul. 4, 1989

[54] TOOL HOLDER IN OR FOR AN EDGE TOOL

[76] Inventors: Raymond L. Simmonds; Douglas A. Greensall, both of 56, Caroline Street, Birmingham. B3 1UF, United Kingdom

[21] Appl. No.: 287,614

[22] Filed: Dec. 16, 1988

Related U.S. Application Data

[63] Continuation of Ser. No. 90,707, filed as PCT GB86/00779 on Dec. 19, 1986, published as WO87/03831 on Jul. 2, 1987, abandoned.

[30] Foreign Application Priority Data

Dec. 30, 1985 [GB] United Kingdom ................. 8531509
Mar. 20, 1986 [GB] United Kingdom ................. 8606868

[51] Int. Cl.$^4$ .......................................... B23P 15/28
[52] U.S. Cl. ..................... 407/104; 407/105; 407/102
[58] Field of Search ................... 407/104, 105, 70, 71; 407/117, 76, 101, 103, 102, 73

[56] References Cited

U.S. PATENT DOCUMENTS

| | | | |
|---|---|---|---|
| 3,343,431 | 9/1967 | Boyer | 407/102 |
| 3,357,080 | 12/1967 | Milewski | 407/105 |
| 3,490,117 | 1/1968 | Hertel | 407/104 |
| 3,996,651 | 12/1976 | Heaton et al. | 407/104 |

Primary Examiner—James G. Smith
Assistant Examiner—Lawrence Cruz
Attorney, Agent, or Firm—Parmelee, Miller, Welsh & Kratz

[57] ABSTRACT

A tool holder for holding a replaceable tool bit having a body part and a cutting edge, the tool holder having a body provided with first and second clamping members which co-operate, in the use, to clamp the tool bit to the body, the first clamping member having a tool bit engageable portion for engagement with the body part of the bit, a fulcrum portion in engagement with the tool holder body and a load applying portion whereat a load is applied to the first clamping member to cause the member to pivot about the fulcrum and so urge the bit, in use, towards the second clamping member. In one version the tool bit is of polygonal shape in side elevation and has a cutting edge at each corner of the polygon, so that a selected one of the cutting edges may be brought into an operative position relative to the tool holder by rotating the bit about the first clamping member so that the selected edge is presented to a work piece for cutting engagement therewith.

10 Claims, 2 Drawing Sheets

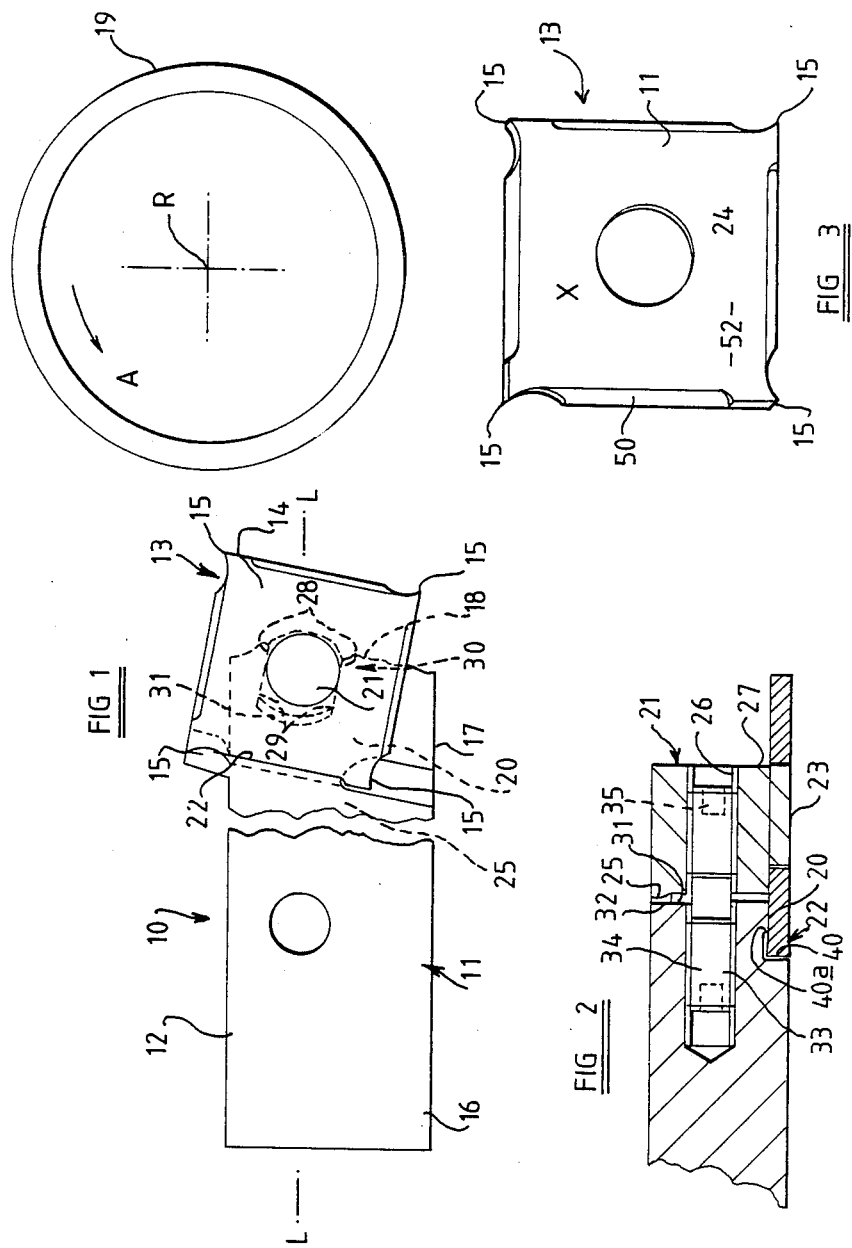

TOOL HOLDER IN OR FOR AN EDGE TOOL

This is a continuation of co-pending application Ser. No. 90,707, filed as PCT GB86/00779 on Dec. 19, 1986, published as WO87/03831 on Jul. 2, 1987, now abandoned.

DESCRIPTION OF INVENTION

This invention relates to tool holders in or for an edge tool such as a parting, boring, turning or like tool having a tool bit.

An object of the invention is to provide a new and improved tool holder in or for an edge tool having a tool bit.

According to one aspect of the invention we provide an edge tool comprising a tool holder having a body with an end face and a replaceable tool bit having a body part and a cutting edge, the body part being clamped to the tool holder and the body part projecting from the end face of the tool holder so that the cutting edge is disposed outwardly of said end face and the tool bit being shaped and arranged so as to withstand loads imposed thereon in use.

The tool bit may be of polygonal shape in side elevation and may have a cutting edge at each corner of the polygon.

Preferably the tool bit is square in side elevation and has four cutting edges, one at each of the corners.

The tool bit may be clamped to the holder body with a side surface of the tool bit in engagement with a mounting surface of the body which extends generally away from said end face.

The tool bit may be clamped to the holder body by engagement of a first clamp member is a recess within the body part of the bit and by engagement of a second clamping means with a peripheral portion of the tool bit, and means to cause relative movement between the first and second clamping members to urge the members into clamping engagement with the bit.

The first clamping member may be movable relative to the tool holder body and the second clamping member may be fixed relative to the tool holder body.

The first clamping member may comprise a member about which the bit is rotatable so as to bring a desired one of the cutting edges into an operative position relative to the tool holder wherein, in use, the edge is presented to a workpiece for cutting engagement therewith.

The first clamping member may comprise a member having a tool bit engaging portion in engagement with the body part of the bit, a fulcrum portion in engagement with the tool holder body and a load applying portion where at a load is applied to the first clamping member to cause the member to pivot about the fulcrum and so urge the bit towards the second clamping member.

The load applying portion may be disposed between the fulcrum and the tool bit engaging portion.

The second clamping means may comprise an abutment surface of the tool holder body.

The first clamping member may project from the mounting surface of the tool holder body and the second clamping member may comprise a shoulder at an inner side of said surface which is on the opposite side of the mounting surface to that bounded by said end face of the tool holder body.

The shoulder may comprise a surface extending upwardly and outwardly relative to the surface as to be inclined at an acute angle to the perpendicular and being in engagement with an edge surface of the tool bit which is correspondingly inclined, thereby urging the tool bit towards the mounting surface.

The mounting surface of the tool holder may have a recess therein in which the first clamping means is slightly and non-rotatably received and there being a screw-threaded member having a screw thread of opposite hand at opposite ends, one end being engaged in a screw-threaded passage in the holder body and the other in a screw-threaded passage in the first clamping member so that rotation of the screw-threaded member moves the first clamping member towards the second clamping member.

The recess may be open-ended at one end, which end extends inwardly from said end surface of the tool holder.

The recess may comprise a slot which extends through the tool holder body from the mounting surface to the opposite surface.

According to a second aspect of the invention we provide a tool bit for use in an edge tool according to the first aspect of the invention and having any of the features of the tool bit set out in relation to the first aspect of the invention.

According to a third aspect of the invention we provide a tool holder for holding a replacable tool bit having a body part and a cutting edge, the tool holder having a body provided with first and second clamping members which co-operate, in use, to clamp the tool bit to the body, the first clamping member having a tool bit engageable portion for engagement with the body part of the bit, a fulcrum portion in engagement with the tool holder body and a load applying portion whereat a load is applied to the first clamping member to cause the member to pivot about the fulcrum and so urge the bit, in use, towards the second clamping member.

The first clamping member may be moveable relative to the tool holder body and the second clamping member may be fixed relative to the tool holder body.

The load applying portion may be disposed between the fulcrum and the tool bit engaging portion.

The second clamping means may comprise an abutment surface of the tool holder body.

In a first more specific aspect of the third aspect of the invention the holder body may have an end face and a mounting surface which extends generally away from end face, against which the tool bit is clamped, in use.

The tool bit may, in use, be clamped to the holder body by engagement of the first clamping member in a recess within the body part of the bit and by engagement of a second clamping means with a peripheral portion of the tool bit, and means to cause relative movement between the first and second clamping members to urge the members into clamping engagement with the bit.

The first clamping member may comprise a member about which the bit is rotatable so that, when the tool bit is of polygonal shape in side elevation and has a cutting edge at each corner of the polygon, a desired one of the cutting edges may be brought into an operative position relative to the tool holder wherein, in use, the edge is presented to a work piece for cutting engagement therewith.

Preferably the tool bit is square in side elevation and has four cutting edges, one at each of the corners.

The first clamping member may project from the mounting surface of the tool holder body and the second clamping member may comprise a shoulder at an inner side of said surface which is on the opposite side of the mounting surface to that bounded by said end face of the tool holder body.

The shoulder may comprise a surface extending upwardly and outwardly relative to the surface so as to be inclined at an acute angle to the perpendicular and being in engagement with an edge surface of the tool bit which is correspondingly inclined, thereby urging the tool bit towards the mounting surface.

The mounting surface of the tool holder may have a recess therein in which the first clamping means is slidably and non-rotatably received and there being a screw-threaded member having a screw thread of opposite hand at opposite ends, one end being engaged in a screw threaded passage in the holder body and the other in a screw-threaded passage in the first clamping member so that rotation of the screw-threaded member moves the first clamping member towards the second clamping member.

The recess may be open-ended at one end, which end extends inwardly from said end surface of the tool holder.

The recess may comprise a slot which extends through the tool holder body from the mounting surface to the opposite surface.

In a second more specific aspect of the third aspect of the invention the first clamping member and the tool bit may have inter-engagable male and female portions which restrain the bit from rotation relative to the first clamping member.

The inter-engagable male and female portions may comprise at least two co-operating pegs and sockets or, preferably, a single co-operating rib and groove.

Preferably the female portion is provided on the tool bit and the male portion on the holder.

The first clamping member may be moveable relative to an adjacent surface of the holder and the second clamping member may be a surface of the holder which is inclined to said adjacent surface at an included obtuse angle.

The adjacent surface may have a threaded passage extending inwardly of the tool holder in a direction normal to said surface and there being a screw-threaded member having a screw-thread of opposite hand at opposite ends, one end being engaged in said screw-threaded passage in the holder body and the other being in screw-threaded engagement in a screw-threaded passage in the first clamping member so that rotation of the screw-threaded member moves the first clamping member towards the adjacent surface and hence moves the tool bit towards the second clamping member.

According to a fourth aspect of the invention we provide an edge tool comprising a tool holder according to the third aspect and a replaceable tool bit held thereby.

According to a fifth aspect of the invention we provide a tool bit for use in an edge tool according to the fourth aspect of the invention.

Two embodiments of the invention are illustrated, by way of example, in the accompanying drawings wherein:

FIG. 1 is a side elevation of one embodiment of the invention showing a tool holder and tool bit mounted on the holder:

FIG. 2 is a section on the line 2—2 of FIG. 1 to an enlarged scale;

FIG. 3 is a perspective view of the tool bit of FIG. 1.

Figure 4:
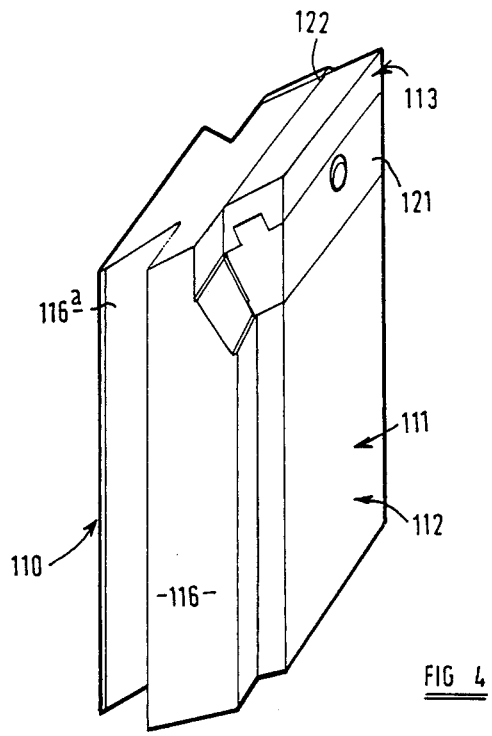
FIG. 4 is a prospective view of a second embodiment of the invention showing a tool holder and a bit mounted on the holder.

Referring to FIGS. 1 to 3 an edge tool 10 comprises a tool holder 11 having a body 12 and a replaceable tool bit 13 having a body part 14 and four cutting edges 15.

The body of the tool holder has a rectangular in cross-section shank 16 having at one end a head portion 17 with an edge face 18 which, in use, faces a workpiece 19 from which a portion is to be parted off. Of course the tool bit may be used for any other purpose such as grooving. The shank 16 is adapted to be secured in a tool holder of a lathe, not shown, in which the workpiece 19 is rotated in the direction of the arrow A and the tool holder moves the bit 13 into cutting engagement with the workpiece 19.

The head portion 17 of the body 12 has a tool bit mounting surface 20 which extends in a plane perpendicular to the end surface 18 and which is perpendicular to the axis of rotation R of the workpiece 19. The body part 14 of the tool bit is mounted on the surface 20 in face-to-face relationship and is clamped thereto by first and second clamping members 21 and 22 respectively.

The first clamping member 21 comprises a circular tool bit engaging portion 23 which is received within a circular opening 24 in the body part 14 so that the tool bit 13 can rotate about an axis X so as to permit any desired one for the four cutting edges 15 to be brought into cutting relationship with the workpiece 19. The first clamping member 21 has at the opposite end to the portion 23 a fulcrum 25 and therebetween a screw-threaded passage 26 in a middle portion 27 of the first clamping member 21 which has parallel sides 28 which are a close sliding fit between parallel sides 29 of a slotted recess 30 formed in the body 12 of the tool holder and which extends inwardly from the end surface 18 and the mounting surface 20.

The slotted recess 30 is bounded at its inner end by a part cylindrical surface 31 against which a corresponding part cylindrical surface 32 of the fulcrum 25 is adapted to engage.

A double-ended screw-threaded member 33 having screw threads of opposite hand at opposite end is engaged so that one is engaged within the screw-threaded passage 26 at the first clamping member 21 and the other end in a screw-threaded recess 34 formed in the tool holder. The member 33 has a socket 35 in its inner end to accommodate a tool such as an Allen key so that rotation of the double-ended member 33 moves the first clamping member 21 inwardly or outwardly, depending upon the direction of rotation of the member 33, within the slotted recess 30.

The second clamping member 22 comprises an abutment surface 40 provided by a shoulder upstanding from the surface 20 at an inner side 40a thereof but inclined thereto so as to extend upwardly and forwardly towards the free end 18 so as to be inclined to a vertical to the surface at an angle of approximately 25°. If desired the angle may be varied from 25° as desired so long as the required clamping effect is achieved. The surface 40 is inclined to a perpendicular to the longitudinal axis L-L of the shank 16 at an angle of approximately 10°. Of course the angle may vary from 10° as desired for any particular circumstances. This angle is also the front clearance angle of the tool bit. Accordingly the angle may be varied to suit the metal it is intended to cut. For example when cutting tough steel a smaller angle of approximately 5° is preferable whereas with softer material such as aluminium then 10° is preferable. The angle could lie substantially in the range 4° to 10° according to the material being machined. In this example the sides 29 are perpendicular to the surface 40 but, if desired, (for example for convenience of machining) they may be parallel to the axis L-L.

Referring now to FIG. 3, the tool bit is square in side elevation having cutting edges 15 at the corners and having straight peripheral edge portions 50 which are inclined to be vertical to the side surface 52 at an angle of approximately 25°. If desired the angle may be varied from 25° as desired so long as the required clamping effect is achieved.

In use, when the screw-threaded member 33 is rotated in the direction to move the first clamping member 21 towards the second clamping member 22, the tool bit 13 is clamped between the clamping members, and the fulcrum 25 of the first clamping member 21 causes the clamping member 21 to tilt, this being permitted by play in the screw threads and between the member 21 and opening 24, so that the tool bit is clamped against the mounting surface 20 by virtue, particularly, of the angle of the surface 40.

It will be noted that the cutting edge 15 projects significantly outwardly beyond the end surface 18 of the tool holder and that the cutting edge 15 is unsupported by the tool holder in a direction tangential to the workpiece 19 at the position of contact with the cutting edge 15. The loads imposed on the cutting edge 15 are, therefore, accommodated solely by the tool bit itself and the moment thus applied to the tool bit is transmitted to, and resisted by, the abutment surface 40 of the second clamping means 22.

The above described square shape of the tool bit ensures that the tool bit has adequate strength so that the forces imposed on the cutting edges 15 are accommodated by the tool bit and transmitted thereby to the tool holders as described hereinbefore.

Although in the present example a tool bit of square configuration having four cutting edges has been described, if desired the tool bit may be of other configuration. For example, it could be of square configuration but provided with only one, two or three cutting edges. Alternatively, it could be of other polygonal configuration such as triangular, pentagonal or hexagonal although shapes other than square are more difficult to manufacture and hence are not preferred. The bit is preferably made of high speed steel coated with Titanium Nitride but it may comprise any other suitable material.

Figure 5:
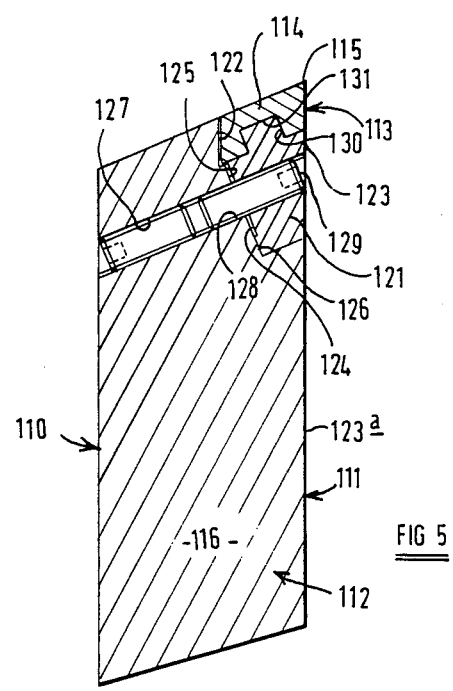
FIG. 5 is a section on the line 5—5 of FIG. 4.

Referring now to FIGS. 4 and 5 an edge tool 110 comprises a tool holder 111 having a body 112 and a replaceable tool bit 113 having a body part 114 and a single cutting edge 115. The body 112 of the tool holder has a generally rectangular cross-section shank 116 but provided with a desired configuration to enable it to fit into a lathe or other tool with which it is to be used. For example as shown in FIG. 4 the shank may be provided with a dovetail cross-section rib 116a.

The shank 116 is adapted to be secured in a tool holder of a lathe using the rib 116a, in which a workpiece is rotated in the direction of the arrow A and the tool holder moves the bit 113 into cutting engagement with the workpiece. The tool bit 113 is clamped to the body 112 by a clamping means, comprising first and second clamping members 121, 122 respectively. The first clamping member 121 comprises a generally truncated prism shape having a first surface 123 which, in use, lies generally in the plane of the remainder of the surface 123a of the tool holder and a second surface 124 which lies generally parallel to an adjacent surface 125 of the tool holder which is inclined to the surface 123a at an angle of 24°. Of course, if desired, the surface 125 may be inclined to the surface 123a at any other suitable angle.

The second clamping member 122 is provided by a surface which is inclined to the adjacent surface 125 at an included obtuse angle of 156°. Again, if desired, this angle may be varied as appropriate from that described hereinbefore so long as the desired clamping action, hereinafter described is acheived.

The first clamping member 121 on the surface 124 thereof is provided with a transversely extending rib which provides a fulcrum 126 which engages the surface 125. A screw threaded passage 127 is formed in the holder body normal to the surface 125 and a screw threaded passage but of opposite hand is formed through the first clamping member 121 as shown on 128. A double ended screw 129 is threaddedly engaged within the passages 127, 128 and is provided with a hexagon recess 129a at its outer end for engagement by a tool to enable it to be rotated and thus to move the clamping member 121 towards or away from the surface 125.

At its upper end the first clamping member 121 is provided with a transversely extending rib 130 which is substantially square in cross-section and is received within a correspondingly shaped groove 131 formed in the tool bit 115. Thus, as the screw 129 is rotated to move the first clamping member 121 towards the surface 125 the interengagment between the rib and groove 130, 131 urges the tool bit 113 against the surface 122 and the fulcrum 126 causes the clamping member 121 to tilt, this being permitted by play in the screw threads, so that the tool bit 113 is clamped against the surface 122 and the inclination of the surface 122 to the co-operating side surfaces of the groove and rib 130, 131 ensure that the tool bit 113 is securely clamped in position.

By providing a rib on the clamping member 121 which co-operates with a groove in the tool bit 113 the strength of the tool bit 113 is improved compared with an arrangement where, for example, the tool bit is provided with two slots within which pegs, provided at transversly spaced positions, on the clamping member 121 engages.

If desired, instead of a single tool bit 113, a plurality of tool bits may be clamped to the tool holder by the clamping member 121 by providing a desired number of tool bits each having a groove corresponding to the groove 131 which is received, at the desired transverse position, on the rib 130. Alternatively, where a single tool bit is provided instead of the tool bit being of the same length as the clamping member 121 it may be of shorter length and located at a desired position transversly of the rib 130. The tool bit 113 may be provided with a cutting edge 115 of any desired configuration to provide a cut of desired shape and the present invention permits easy replacement or interchange of tool bits of desired configuration.

In the present example the bit 113 is made of tungsten carbide or may be made of high speed steel or any other suitable material which can be machined or manufactured by a powder metallurgical techniques.

The features disclosed in the foregoing description, or the accompanying drawing, expressed in their specific forms or in terms of a means for performing the disclosed function, or a metal or process for attaining the disclosed result, or a class or group of substances or compositions, as appropriate, may, separately or any combination of such features, be utilised for realising the invention in diverse forms thereof.

We claim:

1. An edge tool comprising a replaceable tool bit and a tool holder which carries the tool bit,
   (A) the replaceable tool bit having:
      (i) a body part
      (ii) an elongate peripheral portion in clamping engagement with the tool holder, and
      (iii) a cutting edge;
   (B) the tool holder having:
      (a) a body;
      (b) a first clamping member movable relative to the tool body and having a longitudinal axis having disposed therealong in the following order,
         (i) a tool bit engageable portion in engagement with the body part of the bit,
         (ii) a load applying portion, and
         (iii) a fulcrum portion engaging the tool holder body;
      (c) a second clamping member, provided on the too holder body against which said peripheral portion is clamped; and
      (d) means for applying a load to the first clamping member in a direction transverse to said longitudinal axis, at said load applying portion, to urge said elongate peripheral portion into engagement with the second clamping member and tilt the first clamping member about an axis lying in a direction having at least a substantial component parallel to said elongate peripheral portion of the bit, so clamping the bit to the holder body.

2. An edge tool according to claim 1 wherein the tool bit is clamped to the holder body by engagement of the first clamping member in a recess within the body part of the bit.

3. An edge tool according to claim 1 wherein the tool holder body has an end face and mounting surface which extends away from the end face, against which the tool bit is clamped, the first clamping member projecting from the mounting surface of the tool holder body and the second clamping member comprising an abutment surface at an inner side of said mounting surface which is on the opposite side of the mounting surface to that bounded by said end face of the tool holder body.

4. An edged tool according to claim 3 wherein the abutment surface comprises a surface extending upwardly relative to the mounting surface so as to be inclined at an acute angle to a perpendicular to the mounting surface and being in engagement with an edge surface of the tool bit which is correspondingly inclined, thereby urging the tool bit towards the mounting surface.

5. An edge tool according to claim 3 wherein the mounting surface of the tool holder has a recess therein in which the first clamping means is slidably and nonrotatably received and there being a screw-threaded member having a screw thread of opposite hand at opposite ends, one end being engaged in a screw-threaded passage in the holder body and the other in a screw-threaded passage in the first clamping member so that rotation of the screw-threaded member moves the first clamping member towards the second clamping member.

6. An edge tool according to claim 1 wherein the first clamping member and the tool bit have interengageable male and female portions which restrain the bit from rotation relative to the first clamping member.

7. An edge tool according to claim 6 wherein the first clamping member is movable generally perpendicularly relative to an adjacent surface of the tool holder body and second clamping member is a surface of the tool holder body which is inclined to said adjacent surface at an obtuse angle.

8. An edge tool according to claim 7 wherein the adjacent surface has a threaded passage extending within the tool holder in a direction normal to said adjacent surface and there being a screw-threaded member for applying load to the first clamping member, one end of the screw-threaded member being in screw-threaded engagement in said screw-threaded passage in the holder body and the other end of the screw-threded member being in screw-threaded engagement in a screw-threaded passage in the first clamping member so that rotation of the screw-threaded member moves the first clamping member towards the adjacent surface and hence moves the tool bit towards the second clamping member.

9. An edge tool according to claim 1 wherein the fulcrum is on the same side of the first clamping member as the engagement between said elongate peripheral portion and said second clamping member.

10. An edge tool according to claim 1 wherein the second clamping member is afforded by an abutment surface of the tool holder body, which abutment surface is elongate in a direction parallel to said elongate peripheral portion of the bit.

* * * * *